United States Patent
Ushio et al.

(10) Patent No.: US 7,744,325 B2
(45) Date of Patent: Jun. 29, 2010

(54) BOOKLET MAKING METHOD, BOOKLET MAKING SYSTEM, AND PROGRAM

(75) Inventors: Masaru Ushio, Tokyo (JP); Junichi Isamikawa, Tokyo (JP); Yoshihisa Kamata, Tokyo (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 1101 days.

(21) Appl. No.: 11/408,978

(22) Filed: Apr. 24, 2006

(65) Prior Publication Data

US 2007/0008589 A1    Jan. 11, 2007

(30) Foreign Application Priority Data

Jun. 23, 2005    (JP)    ............... 2005-183212

(51) Int. Cl.
*B42C 9/00*    (2006.01)
*B42C 13/00*   (2006.01)
*B42B 9/00*    (2006.01)
*B42D 1/00*    (2006.01)

(52) U.S. Cl. ............... 412/1; 412/9; 412/14; 412/16; 83/934; 281/15.1

(58) Field of Classification Search ............ 83/934; 270/52.26, 52.29; 281/15.1; 412/1, 16; 493/405; B42C 07/00, 19/00, 19/02
See application file for complete search history.

(56) References Cited

U.S. PATENT DOCUMENTS 3,061,850 A * 11/1962 Curtis ............................ 412/1
2005/0105988 A9 * 5/2005 Trovinger et al. ............. 412/16

FOREIGN PATENT DOCUMENTS

| JP | 08-005261   | 1/1996 |
| JP | 2000-211806 | 8/2000 |
| JP | 2004-005468 | 1/2004 |

* cited by examiner

*Primary Examiner*—Dana Ross
*Assistant Examiner*—Justin V Lewis
(74) *Attorney, Agent, or Firm*—Finnegan, Henderson, Farabow, Garrett & Dunner, L.L.P.

(57) ABSTRACT

This invention provides a booklet making method including a cutting size setting step of setting a cutting size on the basis of a difference amount between a layout position of an image when a layout interval between images printed on a printing medium is minimum and a layout position of an image when the layout interval between images is maximum; an image printing step of adjusting the layout interval between the images printed on the printing medium in accordance with a position of the printing medium upon binding, and printing an image on the printing medium; a binding step of binding a plurality of printing media bearing images to prepare a printing medium bundle; a folding step of folding the printing medium in half; and
a cutting step of cutting an edge of the printing medium bundle on the basis of the cutting size.

16 Claims, 10 Drawing Sheets

FIG. 4

| JOB DATA | | | |
|---|---|---|---|
| PAGE-SHARED DATA | | SET NUMBER OF COPIES | 1 | 
| | | NUMBER OF ISSUED COPIES | 0 |
| | | COPY MODE | SINGLE-SIDED→DOUBLE-SIDED |
| | | BOOKLET | ON |
| | | MARGIN | ON |
| | | REFERENCE PAGE INTERVAL A | 2 |
| | | MAXIMUM OFFSET AMOUNT $\alpha_{max}$ | 6 |
| | | POST-PROCESSING MODE | SADDLE STITCHING + CUTTING |
| | | FIRST PLANE COUNTER $n1$ | 1 |
| | | SECOND PLANE COUNTER $n2$ | 1 |
| | | NUMBER $n$ OF SCANNED IMAGE DATA | 16 |
| | | PRINTING PLANE STATUS | FIRST PLANE |
| PAGE-SPECIFIC DATA | PAGE 1 | IMAGE STORAGE ADDRESS | 01***** |
| | PAGE 2 | IMAGE STORAGE ADDRESS | 02***** |
| | ... | ... | |
| | PAGE N | IMAGE STORAGE ADDRESS | 05***** |

131a = PAGE-SHARED DATA section
131b = PAGE-SPECIFIC DATA section
131 = overall table Labels: D1, D2, D3, D4, D5, D5a, D5b, D6, D7a, D7b, D8, D9

BOOKLET MAKING METHOD, BOOKLET MAKING SYSTEM, AND PROGRAM

CROSS-REFERENCE TO RELAINPUTTED APPLICATION

This application makes reference to, incorporates the same herein, and claims all benefits accruing under 35 U.S.C. §119 from an application for BOOKLET MAKING METHOD, BOOKLET MAKING SYSTEM, AND PROGRAM earlier filed in the Japanese Patent Office on Jun. 23, 2005, and thereby assigned Application No. 2005-183212.

BACKGROUND OF THE INVENTION

1. Field of the Invention

The present invention relates to a booklet making system, booklet making method, and program for making a booklet by center-binding, center-folding, and cutting a bundle of printing media on which images are printed.

2. Description of Related Art

Recently, a booklet making system is implemented which comprises an image printing section and post-processing sections, and makes a booklet. The image printing section prints an image on a printing medium. The post-processing sections are a center binding section which staples a bundle of printing media bearing images at the center of the printing media, a center folding section which folds a printing medium, and a cutting section which cuts a printing medium bundle bounded and folded at the center and aligns the edges of the printing media.

In a cutting process by the booklet making system, the excess or deficiency of the cutting size arises depending on the number of printing media of one booklet, or cut edges become nonuniform. To prevent this, there is disclosed a post-processing apparatus which comprises an section for inputting designation a position for cutting at edges or three cutting positions of a printing medium bundle bounded and folded at the center for each printing medium size. The post-processing apparatus controls cutting positions in accordance with data inputted from the section (see patent reference 1: Japanese Unexamined Patent Publication No. 2000-211806).

A printing medium bundle is bounded at the center, folded at the center, and cut at edges. At this time, if the area where an image is printed is equal between all printing media (i.e., the binding margin is equal between them), a printed image on an outer printing medium of the created booklet comes closer to the binding position than that on an inner printing medium, and part of an image may become unclear. To prevent this, there is proposed a booklet system which adjusts, for each printing medium, the distance between images juxtaposed and printed on a printing medium.

For example, there is disclosed an electronic printing apparatus (see patent reference 2: Japanese Examined Patent Publication No. 8-5261) which can set the margin from the fold line to the printing range and a shift increment x. Every time an inner paper sheet is processed, the margin is shifted by the shift increment x to prevent part of an image page from becoming unclear upon folding and part of an image from being cut in trimming paper edges. There is also disclosed an information processing apparatus which stores a margin adjustment amount set for each medium (printing medium) thickness in center-binding booklet printing, and automatically adjusts the margin from the binding position on the basis of the margin adjustment amount for each paper (see patent reference 3: Japanese Unexamined Patent Publication No. 2004-5468).

However, the printing medium size (cutting size) after a cutting process in the booklet making system is set independently of the distance between images juxtaposed on each printing medium. The user must individually set the cutting size and the distance between images printed on a printing medium with poor user friendliness.

SUMMARY OF THE INVENTION

The present invention can provide a booklet making method, booklet making system, and program for increasing the efficiency of a cutting size setting process and thereby improving the user friendliness.

According to the first aspect of the present invention, there is provided a booklet making method of making a booklet, comprising:

a cutting size setting step of setting a cutting size on the basis of a difference amount between a layout position of an image when a layout interval between images printed on a printing medium is minimum and a layout position of an image when the layout interval between images is maximum;

an image printing step of adjusting the layout interval between the images printed on the printing medium in accordance with a position of the printing medium upon binding, and printing an image on the printing medium;

a preparing step of preparing a printing medium bundle by binding and folding a plurality of printing media, wherein the plurality of printing media are folded in half; and a cutting step of cutting an edge of the printing medium bundle on the basis of the cutting size.

According to the second aspect of the present invention, there is provided a booklet making system comprising:

a cutting size setting section which sets a cutting size on the basis of a difference amount between a layout position of an image when a layout interval between images printed on a printing medium is minimum and a layout position of an image when the layout interval between images is maximum;

an image printing section which adjusts the layout interval between the images printed on the printing medium in accordance with a position of the printing medium upon binding, and prints an image on the printing medium;

a preparing section which prepares a printing medium bundle by binding and folding a plurality of printing media, wherein the plurality of printing media are folded in half; and a cutting section which cuts an edge of the printing medium bundle on the basis of the cutting size.

In the preparing section and the preparing step, binding and folding may be carried out simultaneously.

Also, in the preparing section and the preparing step, the plurality of print media may be folded at once and may be folded one by one.

According to the third aspect of the present invention, there is provided a program which causes a computer for rearranging an image printing order of a plurality of image data, adjusting a layout interval between images printed on a printing medium in accordance with a position of the printing medium upon binding, printing on the printing medium, binding a bundle of printing media bearing images, folding the printing medium in half, cutting an edge of the printing medium bundle, and making the printing medium bundle into a saddle-stitched booklet folded in half, to implement a cutting size setting function of setting a cutting size of the cut printing medium bundle on the basis of a difference amount between a layout position of an image when the layout interval between juxtaposed image data is minimum and a layout position of an image when the layout interval between juxtaposed image data is maximum.

The present invention is more specifically described in the following paragraphs by reference to the drawings attached only by way of example.

BRIEF DESCRIPTION OF THE DRAWINGS

A more complete appreciation of the present invention, and many other attendant features and advantages thereof, will become readily apparent as the same becomes better understood by reference to the following detailed description when considered in conjunction with the accompanying drawings in which like reference symbols and reference numerals indicate the same or similar components, wherein:

FIG. 4 is a table showing an example of job data;

FIGS. 5A to 5C are views showing examples of various setting windows, in which FIG. 5A shows an example of a basic window, FIG. 5B shows an example of a paper setting window when a paper setting button is pressed, and FIG. 5C shows an example of an application function setting window when an application setting button is pressed;

FIGS. 6A and 6B are views showing examples of various setting windows, in which FIG. 6A shows an example of a page interval setting window, and FIG. 6B shows an example of an offset setting window;

DETAILED DESCRIPTION OF THE PREFERRED EMBODIMENT

A preferred embodiment of the present invention will be described in detail below with reference to the accompanying drawings.

The arrangement of a booklet making system according to an embodiment of the present invention will be explained.

Figure 1:
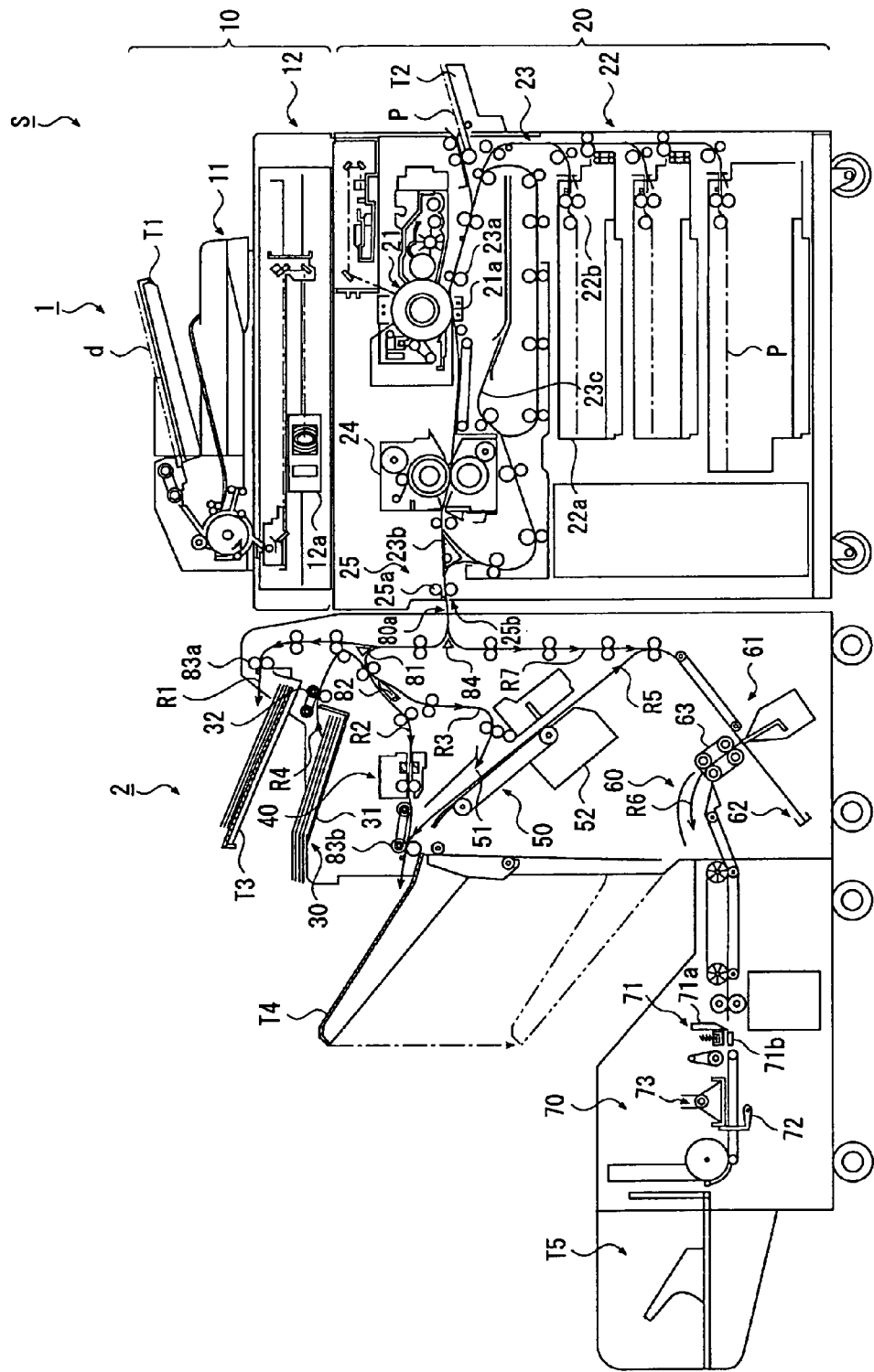
FIG. 1 is a sectional view showing the schematic arrangement of a booklet making system according to an embodiment of the present invention.

FIG. 1 shows the sectional arrangement of a booklet making system S according to the embodiment of the present invention.

The booklet making system S comprises a copying function of reading an image from a document and printing the read image on a printing medium P such as a paper sheet serving as a target processing sheet, a printer function of receiving image data from a personal computer or the like and printing out an image represented by the image data on a printing medium, and a post-processing function of performing a stapling process, punching process, folding process, cutting process, and the like for a printing medium bearing an image. As shown in FIG. 1, the booklet making system S is built by a main body part 1 and post-processing part 2.

The main body part 1 is formed from an image reading section 10 and printing section 20.

The image reading section 10 comprises an automatic document feeder 11 called an ADF (Auto Document Feeder), and a reading unit 12.

A document d set on a document tray T1 of the automatic document feeder 11 is conveyed onto a contact glass serving as the reading portion of the reading unit 12. Images on one or two sides of the document d are read by the optical system of the reading unit 12, and the image of the document d is read by an image sensor 12a. The image includes not only image data such as a figure and photograph, but also text data such as a text and symbol.

An image (analog image signal) read by the reading unit 12 is outputted to an image control section (to be described later), A/D-converted and undergoes various image processes by the image control section, and then outputted to the printing section 20.

The printing section 20, which is a section for performing an image printing process, executes an electrophotographic image printing process on the basis of inputted print data. The printing section 20 comprises an image printing unit 21, feed unit 22, feed convey unit 23, fixing unit 24, and discharge unit 25.

The image printing unit 21 comprises a photosensitive drum, charging device, exposure device, developing device, transfer device 21a, and cleaning portion. The exposure device has a laser output portion for emitting a laser beam representing image data, and a polygon mirror for scanning the laser beam in the main scanning direction.

More specifically, the photosensitive drum charged by the charging device is irradiated with a laser beam to form an electrostatic latent image. The developing device develops the electrostatic latent image by applying charged toner onto the surface of the photosensitive drum bearing the electrostatic latent image. The toner image formed on the photosensitive drum by the developing device is transferred onto the printing medium P by the transfer device. After the toner image is transferred onto the printing medium P, residual charges, residual toner, and the like on the surface of the photosensitive drum are removed by the cleaning portion.

The feed unit 22 comprises a plurality of feed cassettes 22a, feed rollers 22b, a manual feed tray T2, and the like. The feed cassette 22a stores printing media P which are classified in advance by size and type for each feed cassette 22a. Stored printing media P are conveyed one by one from the top by the feed rollers 22b toward the feed convey unit 23. The manual feed tray T2 can stack various types of printing media P in accordance with the user's need. Stacked printing media P are conveyed one by one from the top by feed rollers toward the feed convey unit 23.

The feed convey unit 23 conveys the printing medium P conveyed from the feed cassette 22a or manual feed tray T2 to the transfer device 21a via a plurality of intermediate rollers, registration rollers 23a, and the like.

The feed convey unit 23 conveys a printing medium P having undergone a single-sided image printing process to an automatic double-sided feed convey path 23c by a convey path switching plate 23b. The printing medium P is conveyed to the transfer device 21a again via the intermediate rollers and the registration rollers 23a.

Note that a printing medium surface on which an image is printed before the printing medium passes through the convey path switching plate 23b will be referred to as the first plane.

A printing medium surface on which an image is printed after the printing medium is conveyed to the automatic double-sided feed convey path 23c via the convey path switching plate 23b will be referred to as the second plane.

The fixing unit 24 thermally fixes a toner image transferred onto the printing medium P conveyed by the feed convey unit 23. The image-fixed printing medium P is clamped by delivery rollers 25a of the discharge unit 25, and discharge from a carry-out port 25b to an inlet port 80a of the post-processing part 2.

The post-processing part 2 is a finisher which accumulates, for one copy, printing media P bearing images printed by the main body part 1, and performs post-processes such as a stapling process, folding process, and cutting process. As shown in FIG. 1, the post-processing part 2 comprises a fixed delivery tray T3 on which the printing medium P is discharged, an elevating delivery tray T4, a booklet storage tray T5, a cover feed unit 30, a shift processing unit 40, a stapling unit 50, a folding unit 60, a cutting unit 70, a convey section, and the like.

In the post-processing part 2, the inlet port 80a is formed in flush with the position of the discharge port 25b from which the printing medium P is discharged from the main body part 1. The convey path extending from the inlet port 80a to the downstream side in the convey direction of the printing medium P is branched into four routes: a first convey path R1, second convey path R2, third convey path R3, and seventh convey path R7. The printing medium P is conveyed to one of the convey paths in accordance with the angles of first, second, and third switching gates 81, 82, and 84.

The first convey path R1 is a convey path of the printing medium P when neither a stapling process nor sorting process is performed for a printing medium P which is discharged from the main body part 1 and bears an image. The printing medium P conveyed to the inlet port 80a passes through a convey path on the right side of the first switching gate 81, is clamped by convey rollers, and conveyed up. Then, the printing medium P is clamped by discharge rollers 83a, and discharged onto the fixed delivery tray T3.

The second convey path R2 is a convey path of the printing medium P when a shift process is performed for a printing medium P which is discharged from the main body part 1 and bears an image, or when no shift process is done but a large amount of printing media P are discharged. The printing medium P conveyed to the inlet port 80a passes through a convey path on the down side of the first switching gate 81, is clamped by convey rollers, and passes through the shift processing unit 40. Then, the printing medium P is clamped by discharge rollers 83b, and discharged onto the elevating delivery tray T4 capable of storing a large amount of printing media.

The third convey path R3 is a convey path of the printing medium P when a stapling process is performed for a printing medium P which is discharged from the main body part 1 and bears an image. The printing medium P conveyed to the inlet port 80a passes through a convey path on the down side of the second switching gate 82, is clamped by convey rollers, and discharged onto an inclined stack table 51. The printing medium P discharged onto the stack table 51 stops when its distal end in the convey direction abuts against the abutment surface of a movable stopper member near a stapler 52. After a predetermined number of printing media P are stacked and aligned on the stack table 51 at the stop position, the stapler 52 performs a stapling process to staple the bundle of printing media P. The bundle of printing media P slides on the support surface of the stack table 51, is obliquely pushed up, clamped by the discharge rollers 83b, and discharged onto the elevating delivery tray T4.

The seventh convey path R7 is a convey path used when a folding process is performed without executing stapling. The printing medium P discharged from the main body is conveyed from the inlet port 80a to the seventh convey path R7, and stops at the abutment surface of a movable stopper member 62. After a predetermined number of printing media P are stacked and aligned on the movable stopper member 62, the folding unit 60 executes various folding processes, and the printing media P are conveyed to the cutting unit 70.

The cover feed unit 30 comprises feed rollers 32, and a cover stacking portion 31 which stores slip sheets, cover sheets, and the like. A slip sheet or cover sheet stored in the cover feed unit 30 is separated, fed, clamped by the convey rollers 32, and conveyed onto the stack table 51. A path extending from the cover stacking portion 31 to the third convey path R3 via the feed roller 32 is defined as a fourth convey path R4.

The stapling unit 50 comprises the stack table 51 and stapler 52. The stapling unit 50 aligns widthwise a bundle of printing media P which undergo an image printing process in the main body part 1, are conveyed into the inlet port 80a of the post-processing part 2, and conveyed onto the stack table 51 by a plurality of convey rollers. Then, the stapling unit 50 performs a stapling process of stapling the bundle of printing media P by the stapler 52. The stapled bundle of printing media P is conveyed to the folding unit 60 via the elevating delivery tray T4 or a fifth convey path R5.

The stapler 52 can move in a direction perpendicular to the printing medium convey direction. In response to an instruction from the image control section (to be described later), the stapler 52 is moved in accordance with the printing medium size and a binding position based on the instruction, and performs a stapling process such as an edge binding process of binding printing media at the edge, or a saddle stitching process of stitching printing media at the center in the printing medium convey direction.

The folding unit 60 comprises a stack table 61, the movable stopper member 62, press rollers 63, and the like. The folding unit 60 performs a folding process such as a center folding process, three-folding process, or Z-folding process. The center folding process is to fold a printing medium P or a bundle of printing media P conveyed through the fifth or seventh convey path R5 or R7 at the center in the convey direction of the printing medium P (i.e., at a position where a staple is put in a bundle of printing media by a saddle stitching process). A folded printing medium is conveyed from the press rollers 63 to the cutting unit 70 via a sixth convey path R6.

The cutting unit 70 comprises a cutting knife 71 having an upper cutting knife 71a which can be elevated and a lower cutting knife 71b which is fixed, a movable stopper 72 which can move in the convey direction of the printing medium P and can project toward the convey plane of the printing medium P, a press member 73, and the like. The cutting unit 70 performs a cutting process of cutting a conveyed bundle of printing media P into a size (cutting size) having a designated length in the convey direction of the printing medium P or a direction perpendicular to the convey direction. The cutting size can be adjusted in accordance with the position of the movable stopper 72. The movable stopper 72 is moved by a post-processing control unit 400 (to be described later) in accordance with a cutting size inputted from a control unit 110. In the embodiment of the present invention, a bundle of printing media P is conveyed with the folded portion in the lead. The movable stopper 72 moves in the convey direction of the printing medium P in accordance with the cutting size.

The folded portion of the bundle of printing media P abuts against the movable stopper 72 to position the bundle. Then, the edge of the bundle of printing media P is cut.

A conveyed bundle of printing media P abuts against the movable stopper 72 projecting toward the convey plane of the printing medium P, and stops. The upper surface of the bundle of printing media P near the folded portion is pressed by the press member 73 to fix the bundle. The upper cutting knife 71a moves down to cut the edge of the bundle. After the cutting process, the movable stopper 72 retracts under the convey plane, and the upper cutting knife 71a and press member 73 move up. Then, the cut bundle of printing media P is discharged as a booklet onto the booklet discharge tray T5.

Figure 2:
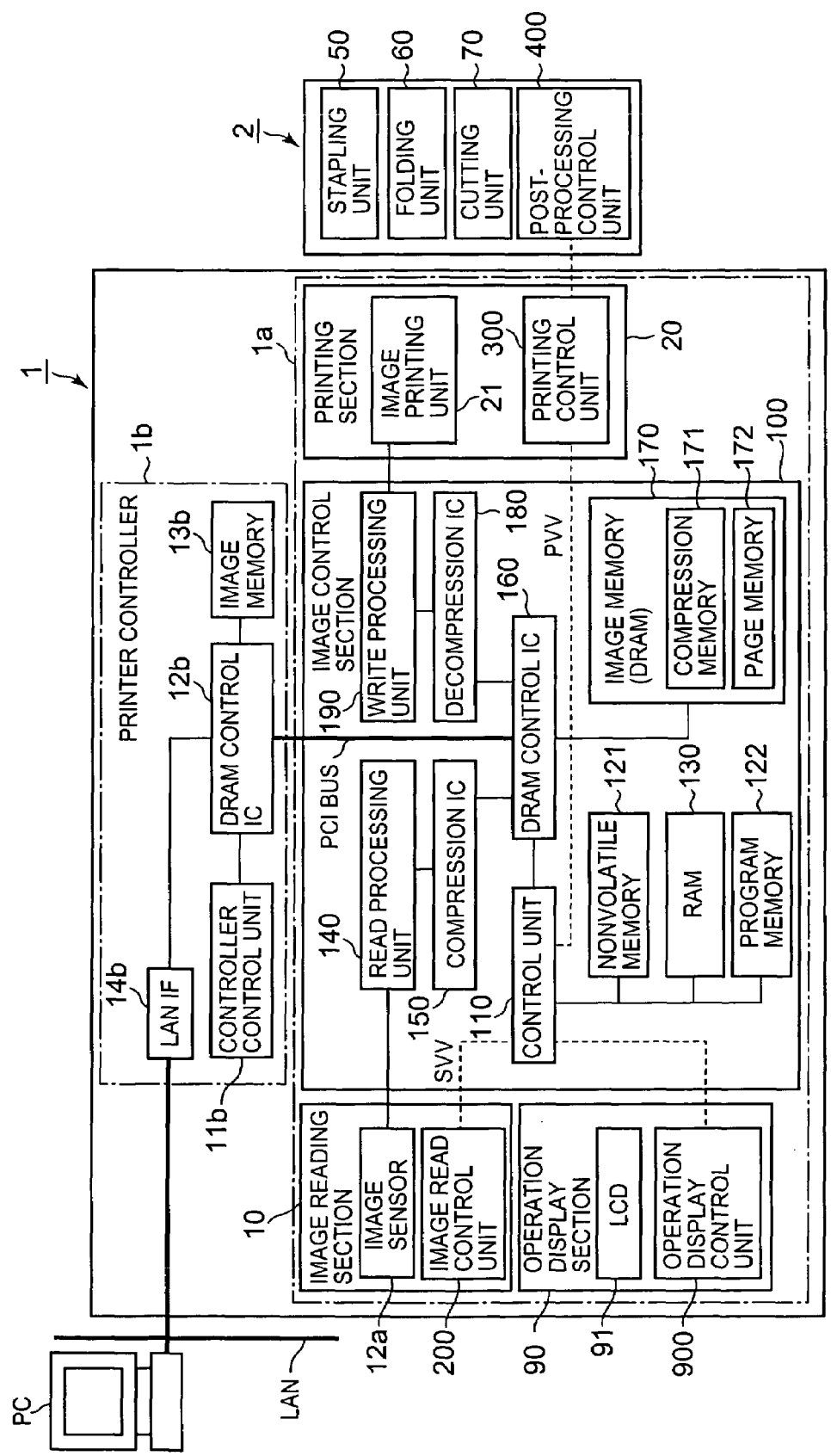
FIG. 2 is a block diagram showing the control circuit of the booklet making system.

FIG. 2 is a block diagram showing the control blocks of the booklet making system S.

As shown in FIG. 2, the booklet making system S is comprised of a main body controller 1a which controls the main body part 1, a printer controller 1b, and the post-processing part 2 which is connected to the main body part 1. The main body part 1 is connected to a user terminal PC on a LAN via a LAN I/F (Local Area Network Interface) 14b of the printer controller 1b so that the main body part 1 and PC can exchange information.

The main body controller 1a comprises the image reading section 10, the printing section 20, an operation display section 90, and an image control section 100. Note that the same reference numerals denote the same building components as those shown in FIG. 1, and a description thereof will be omitted.

The image control section 100 is made up of the control unit 110, a nonvolatile memory 121, a program memory 122, a RAM (Random Access Memory) 130, a read processing unit 140, a compression IC 150, a DRAM (Dynamic Random Access Memory) control IC 160, an image memory 170, a decompression IC 180, a write processing unit 190, and the like.

The control unit 110 is formed from a CPU (Central Processing Unit) and the like. The control unit 110 concentratedly controls the operations of the respective units of the booklet making system S in accordance with various processing programs stored in the nonvolatile memory 121 or program memory 122. For example, the control unit 110 switches between the copy mode, printer mode, scanner mode, and the like in accordance with an operation signal inputted from the operation display section 90, reads out a processing program corresponding to each mode that is stored in the nonvolatile memory 121 or program memory 122, and controls copying, printing, read of image data, and the like. In addition, the control unit 110 sets and instructs a post-processing operation for printed-out printing mediums P in accordance with operation signals inputted from the operation display section 90 or print-out data inputted from the user terminal PC.

The control unit 110 saves an analog image signal inputted from the image reading section 10 on the basis of an image read signal SVV transmitted from an image read control unit 200 of the image reading section 10. Image read operation is in progress when the image read signal SVV is ON, and stops when the image read signal SVV is OFF.

The control unit 110 transmits an image write signal PVV to a printing control unit 300 of the printing section 20. When the image write signal PVV is ON, a toner image formed on the photosensitive drum is transferred onto the printing medium P by the transfer device. When the image write signal PVV is OFF, a toner image formed on the photosensitive drum is not transferred onto the printing medium P by the transfer device.

In order to implement the embodiment of the present invention, the control unit 110 reads out a page interval & cutting size setting program according to the embodiment of the present invention from the nonvolatile memory 121 or program memory 122, and job data from the RAM 130. When data inputted from the operation display section 90 or user terminal PC represents a booklet making instruction in which saddle stitching, center folding, and cutting are set, the control unit 110 juxtaposes image data at horizontally symmetrical positions using the stapling position (center folding position) as a reference in cooperation with the program and data. Then, the control unit 110 forms the image data on a printing medium. At this time, the control unit 110 functions as a cutting size setting section which adjusts the layout interval between images juxtaposed on a printing medium in accordance with the position of the printing medium upon binding, and at the same time, calculates and sets a cutting size W by using equation (1) on the basis of the dimension (longitudinal dimension Y) of the printing medium in the longitudinal direction that is inputted from the operation display section 90 or user terminal PC, and the difference amount (maximum offset amount $\alpha_{max}$) between the layout position of an image when the layout interval between juxtaposed images is maximum and that when the layout interval is minimum. The cutting size is arbitrary as far as a cutting position on a printing medium can be determined when the edge of a printing medium bundle is cut. The cutting size may be a size by which a printing medium is cut off. In the embodiment of the present invention, the cutting size is the lateral dimension of the innermost printing medium after cutting among printing media folded in half into a booklet.

In the embodiment of the present invention, the page interval is the layout interval between images juxtaposed on a printing medium.

In the embodiment of the present invention, the position of a printing medium upon binding is calculated on the basis of the number of image data.

$$W = (Y/2) - \alpha_{max} \quad (1)$$

W: cutting size
Y: longitudinal dimension
$\alpha_{max}$: maximum offset amount

By using equation (1), the cutting size can be easily calculated to reduce the control load on the control unit 110.

The control unit 110 functions as a layout interval calculation section which, when the page interval & cutting size setting program according to the embodiment of the present invention is read out from the nonvolatile memory 121 or program memory 122, job data is read out from the RAM 130, and the layout interval between image data juxtaposed and printed on a printing medium is adjusted in accordance with the number of image data, calculates the layout interval (page interval A) between juxtaposed images for each printing medium on the basis of the minimum layout interval (reference page interval As) between juxtaposed images and the maximum offset amount $\alpha_{max}$ that are inputted from the operation display section 90 or user terminal PC.

Since the page interval of each printing medium can be easily calculated together with the difference amount and the number of image data, the control load on the control unit 110 can be reduced.

Figure 3:
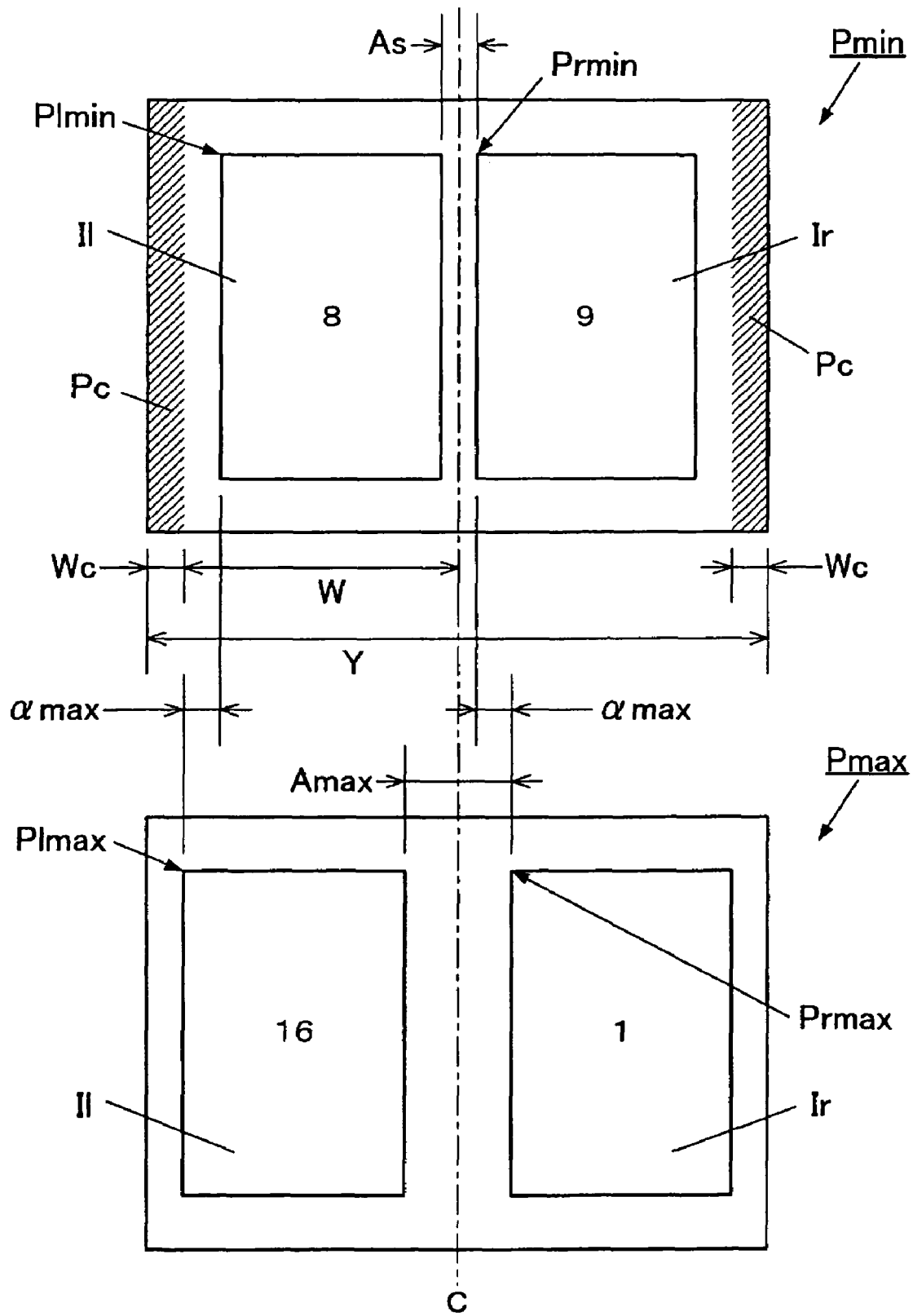
FIG. 3 is an explanatory view showing an example of the layout position of image data when the layout interval between juxtaposed image data is minimum and that when the layout interval between image data is maximum.

FIG. 3 shows an example of the layout position of an image when the layout interval between juxtaposed images is minimum and that when the layout interval is maximum in the case wherein a booklet making instruction in which saddle stitching, center folding, and cutting are set is inputted and the layout interval between images juxtaposed and printed on a printing medium is adjusted in accordance with the number of image data.

$P_{min}$ represents the layout position of an image when the layout interval between juxtaposed images is minimum. $P_{max}$ represents the layout position of image data when the layout interval between juxtaposed images is maximum.

On a printing medium on which images are so juxtaposed as to obtain a half-folded booklet, an image laid out on the right side is defined as a right print image Ir, and an image laid out on the left side is defined as a left print image I1.

A minimum layout interval between juxtaposed images (i.e., the layout interval between the right print image Ir and the left print image I1) is a layout interval between images formed on the innermost printing medium of a created booklet. A maximum layout interval between juxtaposed images is a layout interval between images formed on the outermost printing medium of the created booklet.

As shown in FIG. 3, the reference page interval "As" represents the distance when the layout interval between images is minimum. The maximum offset amount $\alpha_{max}$ represents the distance between the reference layout position (e.g., reference layout position $P1_{min}$ of the left image) of an image having a minimum layout interval between images, and the reference layout position (e.g., reference layout position $P1_{max}$ of the left image) of an image having a maximum layout interval between images.

A page interval (maximum page interval) $A_{max}$ when the layout interval between images is maximum represents a distance obtained by adding a value twice the maximum offset amount $\alpha_{max}$ to the reference page interval "As":

$$A_{max} = As + 2\alpha_{max} \tag{2}$$

$A_{max}$: maximum page interval
As: reference page interval
$\alpha_{max}$: maximum offset amount The layout interval (page interval A) between images can be calculated on the basis of the reference page interval As, the maximum offset amount $\alpha_{max}$, the total number n of image data, and a count value represented by a second plane counter n2 which counts the number of images printed on the second plane. For example, equation (3) below can be used.

Note that the total number n of image data is a multiple of 4. When the number of inputted image data is not a multiple of 4, blank image data is added by a shortage so as to adjust the total number of image data to a multiple of 4. In the embodiment of the present invention, the second plane counter n2 represents what number of the second plane (corresponding to the reverse side in the embodiment of the present invention) of a printing medium corresponds to the current plane subjected to image printing. The value of the second plane counter n2 is obtained by incrementing by one the number of second planes having undergone image printing. When, for example, image printing is not performed immediately after imposing image data on a page but starts after the completion of imposing a series of image data on pages, the value of the second plane counter n2 may represent what number of the second plane of a printing medium corresponds to image data to be imposed.

$$A = As + (2 \times \alpha_{max}) - (\alpha_{max}/((n/4)-1)) \times (n2-1) \times 2 \tag{3}$$

$$= A_{max} - (\alpha_{max}/((n/4)-1)) \times (n2-1) \times 2$$

A: page interval
$A_{max}$: maximum page interval
As: reference page interval
$\alpha_{max}$: maximum offset amount
n: total number of image data
n2: counter value of the second plane counter From equation (3), an offset amount a between juxtaposed images can be calculated by $$a = \alpha_{max} - (\alpha_{max}/((n/4)-1)) \times (n2-1) \tag{4}$$

Images to be juxtaposed are sequentially laid out by offset amounts a calculated from stapling positions C (center folding positions), and an image on the outermost printing medium has the shortest distance to the edge of the printing medium in the longitudinal direction among the remaining images. By setting a cutting width Wc of a cut piece Pc equal to the offset amount (maximum offset amount $\alpha_{max}$) of the outermost printing medium, printing media can be cut so that the distances each from the edge of a cut printing medium in the longitudinal direction to an image become equal to each other without cutting the outermost printing medium. A cutting size W can be calculated using equation (1) on the basis of the longitudinal dimension Y of the printing medium and the maximum offset amount $\alpha_{max}$.

The nonvolatile memory 121 stores data associated with image printing, data of a post-process which is set in the post-processing control unit 400 via the printing section 20 for a printing medium P having undergone an image printing process, data processed by various programs, and the like.

The program memory 122 stores various processing programs associated with image printing, the page interval & cutting size setting program according to the embodiment of the present invention, and the like.

In FIG. 2, the nonvolatile memory 121 and program memory 122 are separately arranged. Alternatively, a single nonvolatile memory which stores various programs and data may be adopted.

The RAM 130 forms a work area for temporarily storing various programs executed by the control unit 110 and data associated with these programs. In order to implement the embodiment of the present invention, the RAM 130 stores job data and various work data.

FIG. 4 shows an example of the job data.

As shown in FIG. 4, job data 131 is formed from data in common with all pages (page-common data 131a) and data specific to each printed-out page (page-specific data 131b).

The page-shared data 131a contains setting conditions based on an operation signal inputted from the user terminal PC or the operation display section 90 (to be described later), and data representing the operation states of an image printing operation and post-processing operation.

For example, the page-common data 131a includes a set copy count D1, an printed-out copy count D2, a copy mode D3, booklet data D4, margin data D5, set values D5a and D5b of the reference page interval data A and maximum offset amount data $\alpha_{max}$, a post-processing mode D6, a counter value D7a, a counter value D7b, a scanned-image count D8, a printing plane status D9, and the like. The set copy count D1 represents the number of printing-out copies of printing media P. The printed-out copy count D2 represents the count value of printed-out copies. The copy mode D3 represents a plane on which image data is printed, i.e., a mode from single-sided printing to duplex printing or from duplex printing to single-sided printing. The booklet data D4 represents whether a booklet making instruction is issued as an application function. The margin data D5 represents whether a margin is designated as an application function. The set values D5$a$ and D5$b$ of the reference page interval data A and maximum offset amount data $α_{max}$ are set when the margin is designated. The post-processing mode D6 represents the type of set post-process. The counter value D7$a$ is given by a first plane counter n1 which counts the number of images printed on the first plane. The counter value D7$b$ is given by the second plane counter n2 which counts the number of images printed on the second plane. The scanned-image count D8 represents the total number n of scanned image data. The printing plane status D9 represents the plane of a printing medium subjected to the image printing operation.

The page-specific data is formed from, e.g., an image storage address representing the address of each image data in the image memory 170 where the image data is stored.

The read processing unit 140 performs various processes such as an analog process, A/D conversion process, and shading process for an analog image signal inputted from the read control unit 200 of the image reading section 10, and generates digital image data. The generated image data is outputted to the compression IC 150.

The compression IC 150 compresses the inputted digital image data and outputs the compressed data to the DRAM control IC 160.

The DRAM control IC 160 controls a compression process of digital image data by the compression IC 150 and a decompression process of compressed image data by the decompression IC 180 in accordance with an instruction from the control unit 110. Further, the DRAM control IC 160 performs an input/output control of image data to/from the image memory 170.

For example, when the DRAM control IC 160 is instructed to save an analog image signal read by the image reading section 10, it causes the compression IC 150 to compress digital image data inputted from the read processing unit 140, and a compression memory 171 of the image memory 170 to store the compressed image data. When the DRAM control IC 160 is instructed to print out compressed image data stored in the compression memory 171, it reads out the compressed image data from the compression memory 171, and causes the decompression IC 180 to decompress the image data, and a page memory 172 to store the decompressed image data. Further, when the DRAM control IC 160 is instructed to print out uncompressed image data stored in the page memory 172, it reads out the uncompressed image data from the page memory 172, and outputs the data to the write processing unit 190.

The image memory 170 comprises the compression memory 171 and page memory 172 which are formed from DRAMs (Dynamic RAMs). The compression memory 171 is used to store compressed image data, whereas the page memory 172 is used to temporarily store uncompressed image data before printing out.

The decompression IC 180 applies a decompresses processing to compressed image data to be inputted.

The write processing unit 190 generates print data for image printing on the basis of uncompressed image data inputted from the DRAM control IC 160, and outputs the print data to the printing section 20.

The image reading section 10 is made up of the CCD (Charge Coupled Device) 12$a$, the image read control unit 200, and the automatic document feeder 11 and reading unit 12 which are illustrated not in FIG. 2 but in FIG. 1. The image read control unit 200 controls the automatic document feeder 11, reading unit 12, and the like to expose and scan a document surface set on the contact glass. The image read control unit 200 photoelectrically converts reflected light by the CCD image sensor 12$a$ to, and reads the image. The read analog image signal is outputted to the read processing unit 140 of the image control section 100.

The operation display section 90 is made up of an LCD (Liquid Crystal Display) 91, operation display control unit 900, and operation keys (not shown). A touch panel is formed on the LCD 91 so as to cover the LCD 91. The operation display control unit 900 displays a basic window for ting print conditions, various process results, and the like on the display screen of the LCD 91 in accordance with a display signal inputted from the control unit 110. The operation display control unit 900 outputs an operation signal inputted from the operation keys or touch panel to the control unit 110.

The operation display section 90 displays various application function operation windows capable of setting a booklet making instruction, stapling process, folding process, cutting process, and the like as application functions. When a booklet making instruction is inputted in the application function operation window, the operation display section 90 displays various setting windows which implement a function as a dimension setting section for setting the dimension (longitudinal dimension Y) of a printing medium in the longitudinal direction, a function as a difference amount setting section for accepting the maximum offset amount $α_{max}$, and a function serving as a layout interval section for accepting the reference page interval As.

FIGS. 5A to 5C, 6A, and 6B show examples of various setting windows.

Figure 5A:
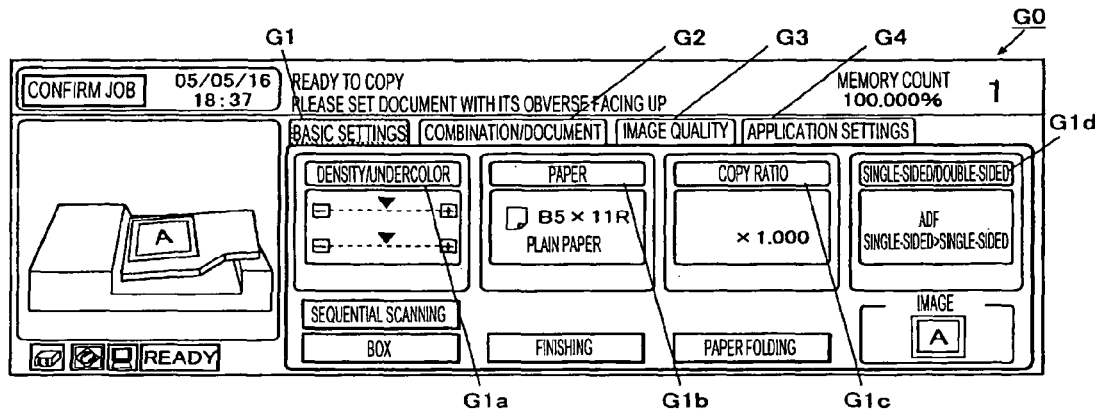
Figure 5B:
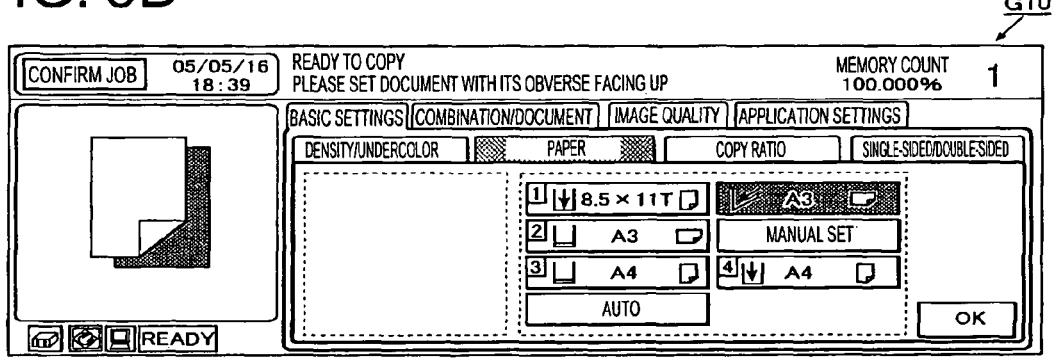
Figure 5C:
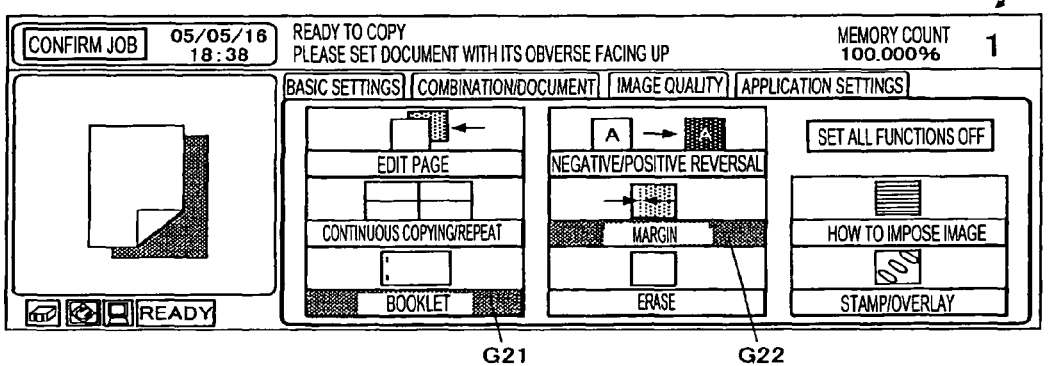
Figures 6A, 6B:
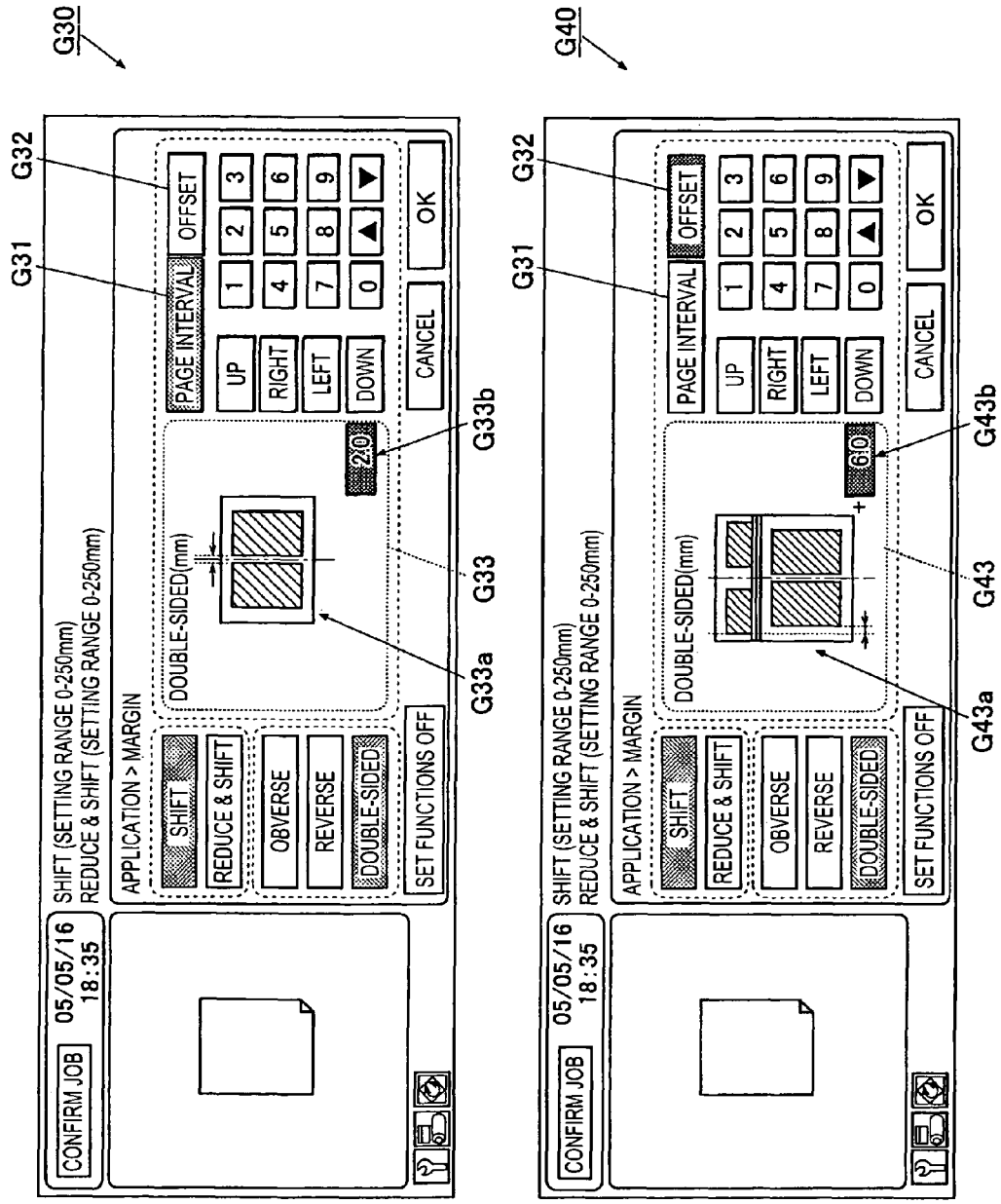

FIG. 5A shows an example of a basic window G0. FIG. 5B shows an example of a paper setting window G10 when a paper setting button is pressed. FIG. 5C shows an example of an application function setting window G20 when an application setting button is pressed. FIG. 6A shows an example of a page interval setting window G30 when a margin button and page interval button are pressed. FIG. 6B shows an example of an offset setting window G40 when the margin button and an offset button are pressed.

The basic window G0 shown in FIG. 5A has a basic setting area G1, a combination/document button G2 for switching to a combination/document setting window, an image quality setting button G3 for switching to an image quality setting window, and an application setting button G4 for switching to the application function setting window G20.

The basic setting area G1 has a density/undercolor setting button G1$a$ for switching to a density setting window for setting the density/undercolor, a paper setting button G1$b$ for switching to the paper setting window G10 for selecting the paper type, a copy ratio setting button G1$c$ for switching to a copy ratio setting window for setting the copy ratio of image data, and a copy mode setting button G1$d$ for switching to a copy mode setting window for setting a copy mode representing a plane on which image data is printed, i.e., a mode from single-sided printing to double-sided one or from double-sided printing to single-sided one.

The paper setting window G10 shown in FIG. 5B displays buttons for selecting settable printing medium types so that each button can be selected. The control unit 110 sets the longitudinal dimension of a set printing medium on the basis of an operation signal from a button pressed by the user.

In the embodiment of the present invention, the longitudinal dimension of the printing medium is set on the basis of an operation signal from a button for selecting a printing medium type. The longitudinal and lateral dimensions of the printing medium may be directly inputted by the user. Alternatively, a function of selecting a printing medium type in accordance with the size of a read image may be adopted to set the longitudinal dimension of a selected printing medium.

The dimension setting section which sets the longitudinal dimension of the printing medium is not limited to them.

The application function setting window G20 shown in FIG. 5C displays buttons for selecting various application functions so that these buttons can be selected. For example, the application function setting window G20 has a booklet button G21 for rearranging the image printing order of a plurality of image data and setting a double-sided printing function so as to form the image data into a saddle-stitched booklet folded in half, a margin button G22 for adjusting the layout position of image data printed on a printing medium and setting margin areas at four edges, and a button for setting a function of reversing a white part of a document into a black one and a black part into a white one, and printing image data.

The page interval setting window G30 shown in FIG. 6A is displayed when the booklet button G21 is pressed and selected in the application function setting window G20 and then a page interval button G31 is pressed in a margin setting window upon the press of the margin button G22.

The page interval setting window G30 has the page interval button G31 for switching to the page interval setting window G30 for setting the reference page interval As, an offset button G32 for switching to an offset setting window for setting the maximum offset amount $\alpha_{max}$, a preview area G33 for prompting the user to visually confirm an image G33a and setting value G33b of the set reference page interval As, a ten-key pad, and the like.

The offset setting window G40 shown in FIG. 6B is displayed when the booklet button G21 is pressed and selected in the application function setting window G20 and then the offset button G32 is pressed in the margin setting window upon the press of the margin button G22.

The offset setting window G40 has the page interval button G31, the offset button G32, a preview area G43 for prompting the user to visually confirm an image G43a and setting value G43b of the set maximum offset amount $\alpha_{max}$, a ten-key pad, and the like.

Since the longitudinal dimension, maximum offset amount $\alpha_{max}$, and reference page interval As can be set by selecting a printing medium type on the basis of an arbitrary operation of the user, the degree of freedom of setting the cutting size can be increased, and the degree of freedom of setting the page interval of each printing medium can be increased. Moreover, since the page interval of each printing medium can be easily calculated, the control load can be reduced.

The respective units of the printer controller 1b will be explained.

The printer controller 1b comprises a controller control unit 11b, DRAM control IC 12b, image memory 13b, and LAN I/F 14b.

The controller control unit 11b implements a function of comprehensively controlling the operations of respective units, and distributing print-out data inputted from the user terminal PC as a job to the main body controller 1a.

The DRAM control IC 12b controls storage of print-out data received by the LAN I/F 14b in the image memory 13b, and read of print-out data outputted from the image memory 13b. The DRAM control IC 12b is connected to the DRAM control IC 160 of the image control section 100 via a PCI (Peripheral Components Interconnect). The DRAM control IC 12b reads out print-out data to be printed from the image memory 13b and outputs it to the DRAM control IC 160 in accordance with an instruction from the controller control unit 11b.

The image memory 13b is formed from a DRAM, and temporarily stores inputted print-out data.

The LAN I/F 14b is a communication interface for connecting the printer controller 1b to a LAN such as a NIC (Network Interface Card) or modem. The LAN I/F 14b receives print-out data to be printed from the user terminal PC via the LAN. The received print-out data is output to the DRAM control IC 12b.

The post-processing part 2 comprises the stapling unit 50, folding unit 60, cutting unit 70, and a convey section 80 having convey rollers and the like for conveying a printing medium to various post-processing units. These units are comprehensively controlled by the post-processing control unit 400.

The post-processing control unit 400 performs control of conveying a printing medium P to a predetermined post-processing unit along the convey path in accordance with a post-processing instruction signal inputted from the control unit 110 via the printing control unit 300, driving and controlling each unit to perform a predetermined post-process for the printing medium P, and discharging the printing medium P to a predetermined discharge tray.

The operation according to the embodiment of the present invention will be explained.

FIGS. 7 to 10 are flowcharts showing a page interval & cutting size setting process according to the embodiment of the present invention. The flowcharts shown in FIGS. 7 to 10 are executed by the control unit 110.

Figure 7:
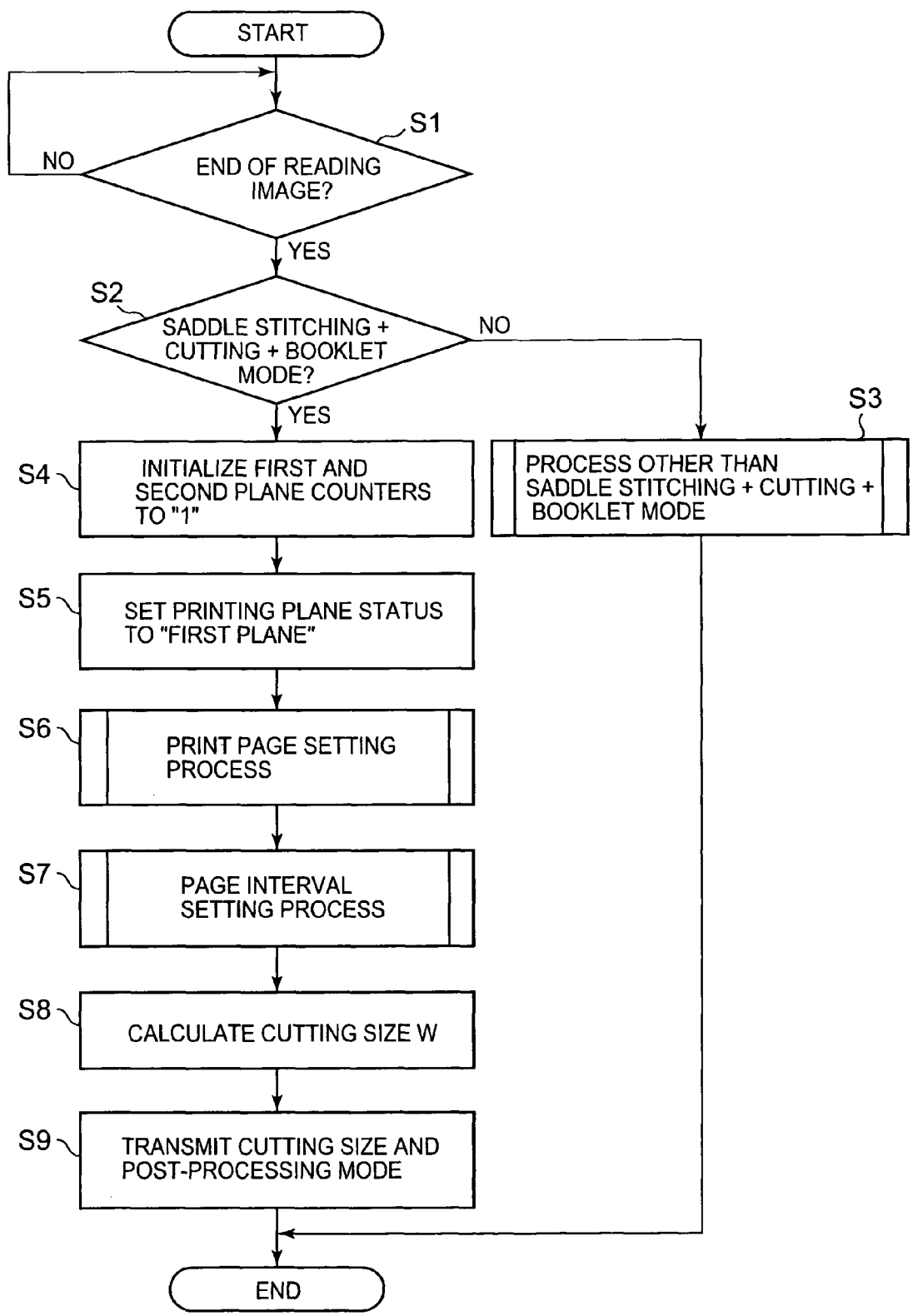
FIG. 7 is a flowchart showing a process executed when an image read signal switches from the ON state to the OFF state after the start of copying.

The flowchart shown in FIG. 7 is executed when an image read operation ends on the basis of the image read signal SVV after the start of copying.

The control unit 110 determines whether the image read operation ends after the start of copying (step S1). If the control unit 110 determines that the image read operation does not end (step S1; NO), the flow waits till the end of the operation.

If the control unit 110 determines that the image read operation ends (step S1; YES), it refer to the copy mode D3 of the job data 131 set at the end of image reading, and determines whether all the saddle stitching process, cutting process, and booklet making process are set (step S2).

If the control unit 110 determines that all the saddle stitching process, cutting process, and booklet making process are not set (step S2; NO), it executes other processes in which all the saddle stitching process, cutting process, and booklet making process are not set, i.e., various processes corresponding to the stapling process and the like which do not require the page interval & cutting size setting process.

If the control unit 110 determines that all the saddle stitching process, cutting process, and booklet making process are set (step S2; YES), it initializes the counter values D7a and D7b of the first and second plane counters n1 and n2 of the job data 131 (sets the counter values D7a and D7b to 1) (step S4).

After initializing the first and second plane counters n1 and n2, the control unit 110 initializes the printing plane status D9 (sets it to the "first plane") (step S5).

After initializing the first and second plane counters n1 and n2 and the printing plane status D9, the control unit 110 executes a print page setting process to be described later (step S6). After the print page setting process, the control unit 110 executes a page interval setting process to be described later (step S7).

After the page interval setting process (after step S7), the control unit 110 calculates the cutting size W on the basis of the maximum offset amount $\alpha_{max}$ set in the job data 131, the longitudinal dimension Y of a printing medium on which image data is to be printed, and the above-described equation (1). The control unit 110 temporarily stores the cutting size W in the RAM 130 (step S8).

The control unit 110 transmits the calculated cutting size W and the post-processing mode D6 set in the job data 131 to the printing control unit 300 and post-processing control unit 400 (step S9), and ends the process executed after the end of the image read operation.

Figure 8:
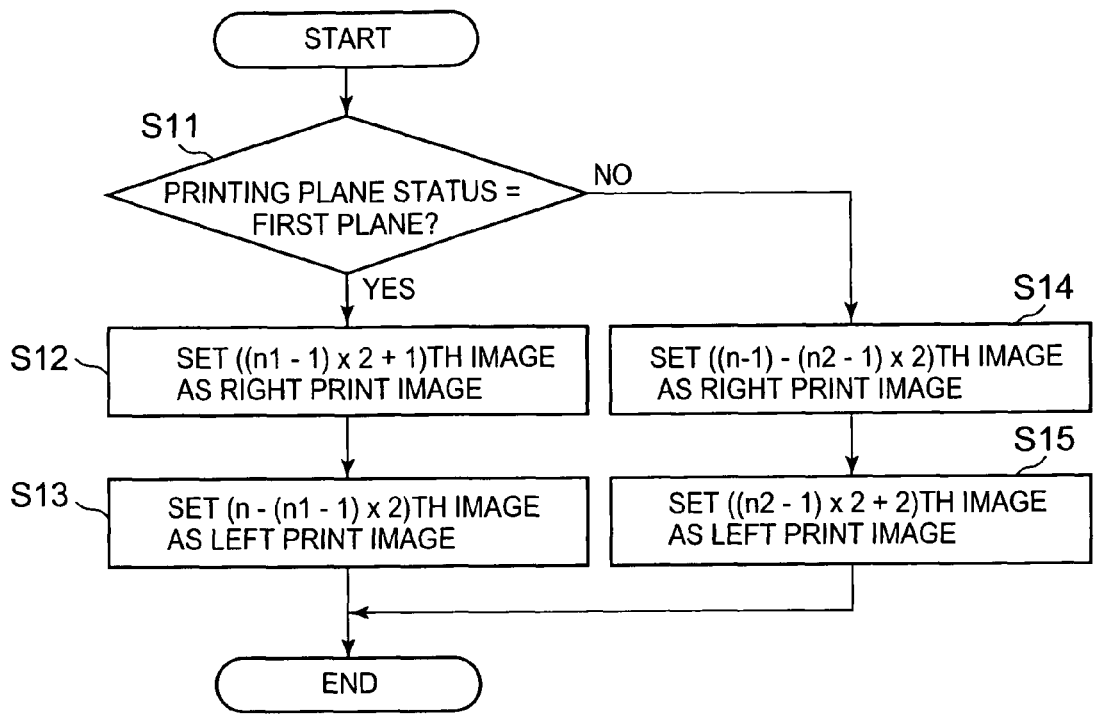
FIG. 8 is a flowchart showing a print page setting process.

FIG. 8 is a flowchart showing the print page setting process executed in step S6 of FIG. 7. The print page setting process is to rearrange the image printing order of a plurality of image data and set image data to be printed on a printing medium so as to form the image data into a saddle-stitched booklet folded in half.

The control unit 110 refers to the job data 131, and determines whether the printing plane status D9 represents the "first plane" (step S11).

If the control unit 110 determines that the printing plane status D9 represents the "first plane" (step S11; YES), it refers to the job data, reads out the counter value D7a of the first plane counter n1, and sets image data serving as a right print image (step S12). The right print image can be set by $$Nr = (n1-1) \times 2 + 1 \qquad (5)$$

Nr: page-specific number added to each image data when image data serving as a right print image is read
n1: first plane counter value Further, the control unit 110 refers to the job data, reads out the value D8 represented by the number n of scanned images (i.e., the total number of image data) and the counter value D7a of the first plane counter n1, and sets image data serving as a left print image (step S13). The left print image can be set by $$N1 = n - (n1-1) \times 2 \qquad (6)$$

N1: page-specific number added to each image data when image data serving as a left print image is read
n1: first plane counter value
n: total number of image data If the control unit 110 determines that the printing plane status D9 represents not the "first plane" but the "second plane" (step S11; NO), it refers to the job data, reads out the value D8 represented by the number n of scanned images (i.e., the total number of image data) and the counter value D7b of the second plane counter n2, and sets image data serving as a right print image (step S14). The right print image can be set by $$Nr = (n1-1) - (n2-1) \times 2 \qquad (7)$$

Nr: page-specific number added to each image data when image data serving as a right print image is read
n2: second plane counter value
n: total number of image data The control unit 110 refers to the job data, reads out the counter value D7b of the second plane counter n2, and sets image data serving as a left print image (step S15). The left print image can be set by $$N1 = (n2-1) \times 2 + 2 \qquad (8)$$

N1: page-specific number added to each image data when image data serving as a left print image is read
n2: second plane counter value After the right and left print images are set (after step S13 or S15), the print page setting process ends, and the flow advances to step S7.

Figure 9:
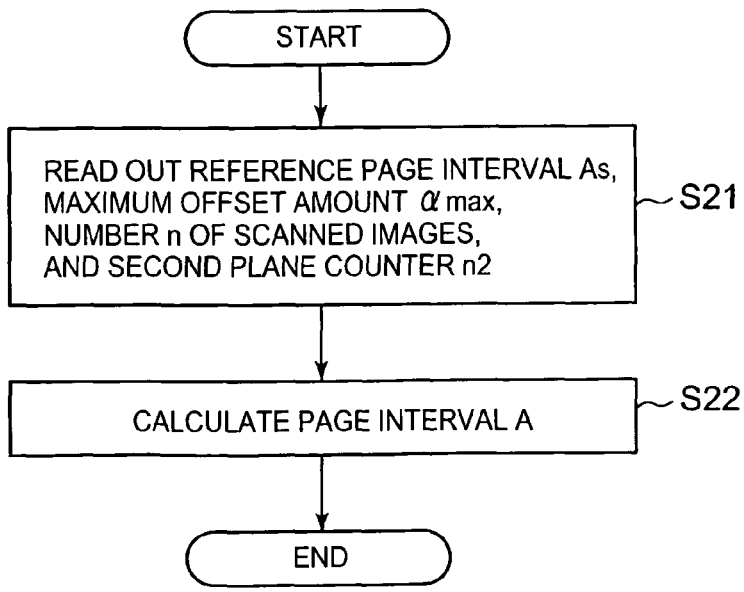
FIG. 9 is a flowchart showing a page interval setting process.

FIG. 9 is a flowchart showing the page interval setting process executed in step S7 of FIG. 7. The page interval setting process is to set the distance (page interval A) between right and left print images set in step S6 when they are juxtaposed on a printing medium.

After step S6, the control unit 110 refers to the job data 131, and reads out the values (D5a, D5b, D8, and D7b) represented by the reference page interval As, the maximum offset amount $\alpha_{max}$, the number n of scanned images (the total number of image data), and the second plane counter n2 (step S21). The control unit 110 calculates the page interval A by using the above-described equation (3).

After the page interval A is calculated and set (after step S22), the page interval setting process ends, and the flow advances to step S8.

Figure 10:
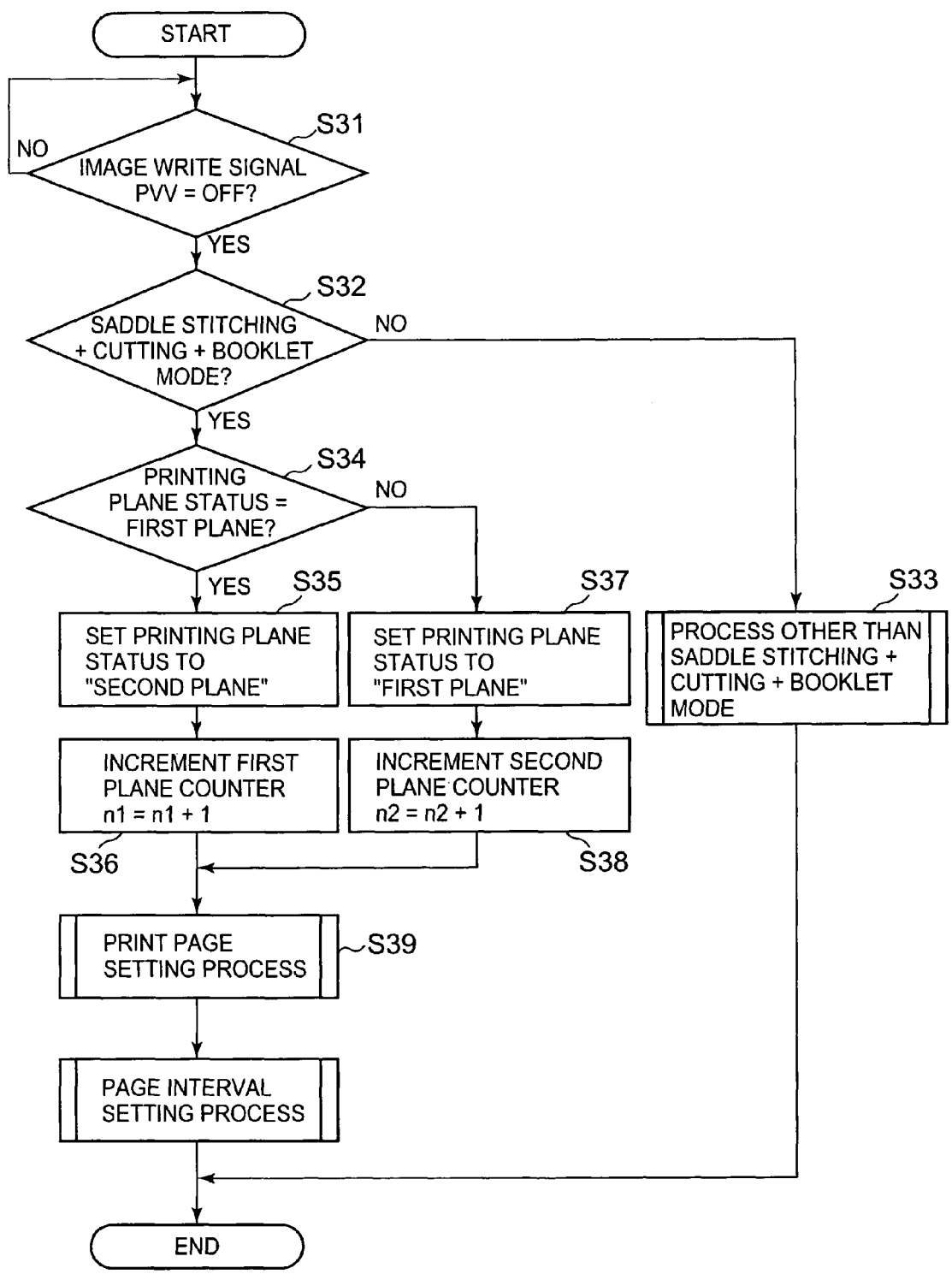
FIG. 10 is a flowchart showing a process executed when an image read process ends after the start of copying, the flow shifts to a printing process, and an image write signal switches from the ON state to the OFF state.

FIG. 10 is a flowchart showing a process executed when the image read process ends after the start of copying, the flow shifts to a printing process, and the image write signal PVV switches from the ON state to the OFF state.

The control unit 110 determines whether the image write signal PVV switches from the ON state to the OFF state (step S31). If the control unit 110 determines that the image write signal PVV does not switch to the OFF state (step S31; NO), the flow waits till switching.

If the control unit 110 determines that the image write signal PVV switches from the ON state to the OFF state (step S31; YES), it refers to the copy mode D3 of the job data 131, and determines whether all the saddle stitching process, cutting process, and booklet making process are set (step S32).

If the control unit 110 determines that all the saddle stitching process, cutting process, and booklet making process are not set (step S32; NO), it executes other processes in which all the saddle stitching process, cutting process, and booklet making process are not set, i.e., various processes corresponding to the stapling process and the like which do not require the page interval & cutting size setting process.

If the control unit 110 determines that all the saddle stitching process, cutting process, and booklet making process are set (step S32; YES), it refers to the printing plane status D9 of the job data 131, and determines whether the printing plane status D9 represents the "first plane" (step S34).

If the control unit 110 determines that the printing plane status D9 represents the "first plane" (step S34; YES), it sets the printing plane status D9 to the "second plane" (step S35), and increments the counter value D7a of the first plane counter n1 by one (step S36).

If the control unit 110 determines that the printing plane status D9 represents not the "first plane" but the "second plane" (step S34; YES), it sets the printing plane status D9 to the "first plane" (step S37), and increments the counter value D7b of the second plane counter n2 by one (step S38).

After setting the printing plane status and the first or second plane counter n1 or n2, the control unit 110 executes the above-described print page setting process (step S39). After the print page setting process, the control unit 110 executes the above-described page interval setting process (step S40).

After the page interval setting process (after step S40), the control unit 110 ends the process executed when the image write signal PVV switches from the ON state to the OFF state.

Figure 11:
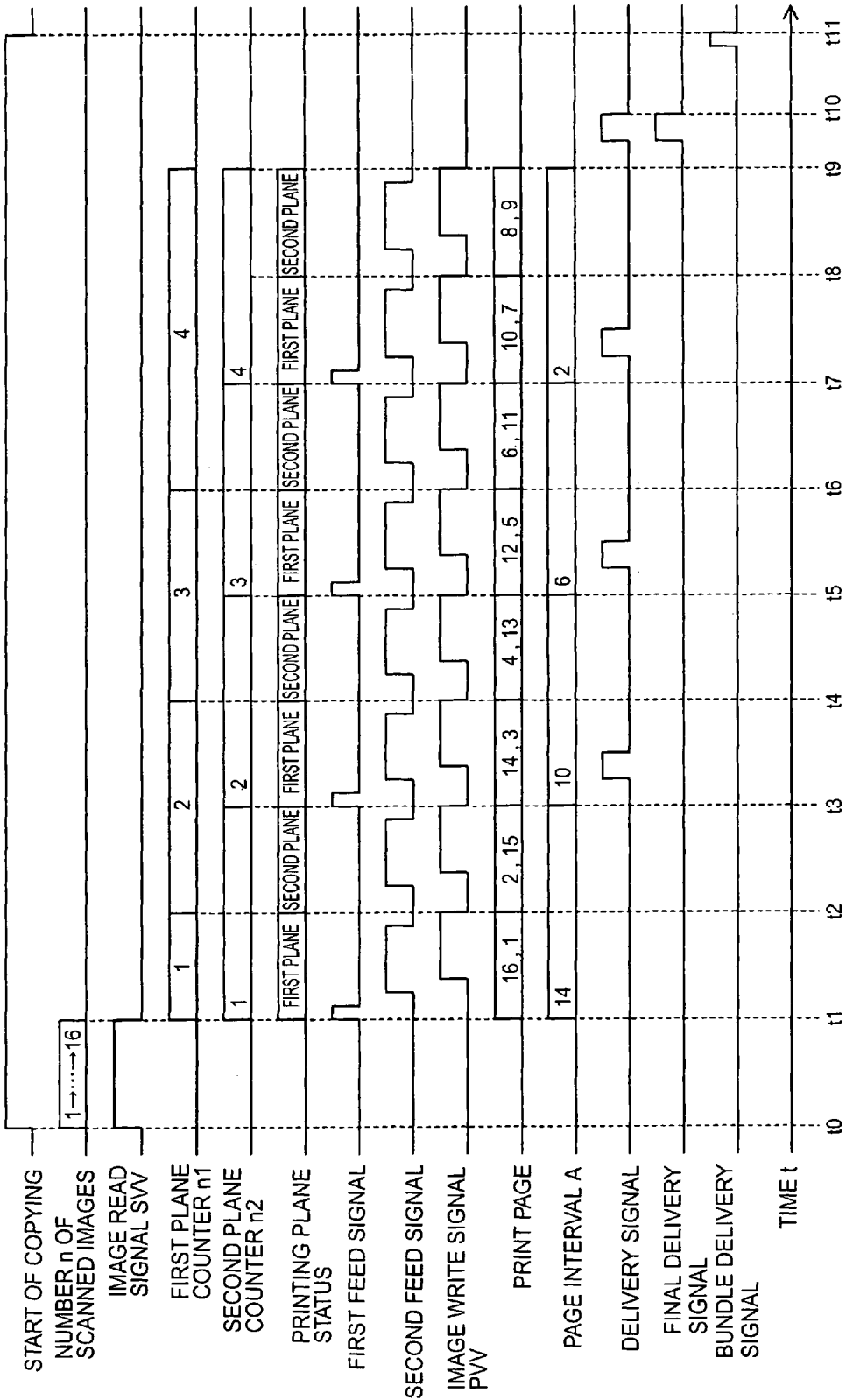
FIG. 11 is a timing chart showing an example of the operation of the booklet making system.

FIG. 11 is a timing chart showing an example of the operation of the booklet making system S when the saddle stitching process, center folding process, cutting process, and booklet making process are set.

The first feed signal is an operation signal which is output from the control unit 110 to the printing control unit 300 to convey a printing medium P from the feed cassette 22a to the registration roller 23a. An "ON" first feed signal represents that the convey operation is in progress. The second feed signal is an operation signal which is output from the control unit 110 to the printing control unit 300 to convey a printing medium from the registration roller 23a to the transfer device 21a. An "ON" second feed signal represents that the convey operation is in progress.

A delivery signal is an operation signal which is output from the printing control unit 300 to the post-processing control unit 400 to discharge a printing medium bearing an image from the delivery roller 25a to the inlet port 80a. An "ON" delivery signal represents that the delivery operation is in progress. A final delivery signal is a signal which is output from the printing control unit 300 to the post-processing control unit 400 and represents that the final printing medium is being conveyed. The final delivery signal is output in synchronism with the delivery signal. A bundle delivery signal is a signal which is output from the post-processing control unit 400 to the control unit 110 via the printing control unit 300 and represents that a bundle of printing media is discharged onto the booklet storage tray.

When the copy start key of the operation display section 90 is pressed at time t0, a copy operation starts, the image read signal SVV changes to the ON state, and a document scanning operation starts. In this example, the number of scanned image data is counted, and 16 image data are scanned at the interval between time t0 and t1.

In the following description, the reference page interval A is 2 [mm], the maximum offset amount $\alpha_{max}$ is 6 [mm], and an A3-size printing medium of 297 [mm]×420 [mm] is set.

At time t1, the document scanning operation ends, and the image read signal SVV switches from the ON state to the OFF state. The first feed signal changes to the ON state, and the operations shown in FIGS. 7 to 9 are executed. The first and second plane counters n1 and n2 are initialized (set to "1"), and the printing plane status is set to the "first plane". The first scanned image data is set as the right print image, and the 16th scanned image data is set as the left print image. At the same time, a page interval A of 14 [mm] and a cutting size W of 204 [mm] are calculated and set. The calculated cutting size W (W=204 [mm]) is transmitted to the post-processing control unit 400.

At the interval between time t1 and time t2, the set image data are formed at the set page interval A (A=14 [mm]) on the first plane of a fed printing medium.

At time t2, write of the image data on the first plane of the printing medium ends, the image write signal PVV switches from the ON state to the OFF state, and the operations shown in FIGS. 8 to 10 are executed. The printing plane status is set from the "first plane" to the "second plane", and the first plane counter n1 is incremented by one (n1=2). The 15th scanned image data is set as the right print image, and the second scanned image data is set as the left print image. At the same time, the page interval A is set to 14 [mm].

At the interval between time t2 and time t3, the set image data are formed at the set page interval A (A=14 [mm]) on the second plane of the fed printing medium.

At time t3, write of the image data on the second plane of the printing medium ends, the image write signal PVV switches from the ON state to the OFF state, and the operations shown in FIGS. 8 to 10 are executed. The printing plane status is set from the "second plane" to the "first plane", and the second plane counter n2 is incremented by one (n2=2). The third scanned image data is set as the right print image, and the 14th scanned image data is set as the left print image. At the same time, the page interval A is set to 10 [mm].

At the interval between time t3 and time t4, the set image data are formed at the set page interval A (A=10 [mm]) on the first plane of a fed printing medium. At the interval between time t1 and t3, the printing medium on which the image data are printed is discharged to the post-processing part 2.

At time t4, write of the image data on the first plane of the printing medium ends, the image write signal PVV switches from the ON state to the OFF state, and the operations shown in FIGS. 8 to 10 are executed. The printing plane status is set from the "first plane" to the "second plane", and the first plane counter n1 is incremented by one (n1=3). The 13th scanned image data is set as the right print image, and the fourth scanned image data is set as the left print image. At the same time, the page interval A is set to 10 [mm].

At the interval between time t4 and time t5, the set image data are formed at the set page interval A (A=10 [mm]) on the second plane of the fed printing medium.

At time t5, write of the image data on the second plane of the printing medium ends, the image write signal PVV switches from the ON state to the OFF state, and the operations shown in FIGS. 8 to 10 are executed. The printing plane status is set from the "second plane" to the "first plane", and the second plane counter n2 is incremented by one (n2=3). The fifth scanned image data is set as the right print image, and the 12th scanned image data is set as the left print image. At the same time, the page interval A is set to 6 [mm].

At the interval between time t5 and time t6, the set image data are formed at the set page interval A (A=6 [mm]) on the first plane of a fed printing medium. At the interval between time t3 and time t5, the printing medium on which the image data are printed is discharged to the post-processing part 2.

At time t6, write of the image data on the first plane of the printing medium ends, the image write signal PVV switches from the ON state to the OFF state, and the operations shown in FIGS. 8 to 10 are executed. The printing plane status is set from the "first plane" to the "second plane", and the first plane counter n1 is incremented by one (n1=4). The 11th scanned image data is set as the right print image, and the sixth scanned image data is set as the left print image. At the same time, the page interval A is set to 6 [mm].

At the interval between time t6 and time t7, the set image data are formed at the set page interval A (A=6 [mm]) on the second plane of the fed printing medium.

At time t7, write of the image data on the second plane of the printing medium ends, the image write signal PVV switches from the ON state to the OFF state, and the operations shown in FIGS. 8 to 10 are executed. The printing plane status is set from the "second plane" to the "first plane", and the second plane counter n2 is incremented by one (n2=4). The seventh scanned image data is set as the right print image, and the 10th scanned image data is set as the left print image. At the same time, the page interval A is set to 2 [mm].

At time t7, a value calculated by dividing the number n of scanned images by 4 coincides with the value of the second plane counter n2. Hence, final paper information representing that a printing medium on which images are to be formed is the final printing medium is generated.

At the interval between time t7 and time t8, the set image data are formed at the set page interval A (A=2 [mm]) on the first plane of a fed printing medium. At the interval between time t5 and time t7, the printing medium on which the image data are printed is discharged to the post-processing part 2.

At time t8, write of the image data on the first plane of the printing medium ends, the image write signal PVV switches from the ON state to the OFF state, and the operations shown in FIGS. 8 to 10 are executed. The printing plane status is set from the "first plane" to the "second plane". Since the final paper information has been generated, the first plane counter n1 is not incremented by one. The ninth scanned image data is set as the right print image, and the eighth scanned image data is set as the left print image. At the same time, the page interval A is set to 2 [mm].

At the interval between time t8 and time t9, the set image data are formed at the set page interval A (A=2 [mm]) on the second plane of the fed printing medium.

At the interval between time t9 and time t10, the printing medium on which the image data are printed at the interval between time t7 and time t9 is discharged to the post-processing part 2.

At time t10, all the printing media to be bound into a booklet are conveyed to the post-processing part 2. At the interval between time t10 and t11, the bundle of printing media conveyed to the post-processing part 2 is saddle-stitched and folded at the center. The movable stopper 72 moves in the printing medium convey direction in accordance with the cutting size W so as to cut the bundle into the set cutting size W (W=204 [mm]). The bundle of printing media positioned by the movable stopper 72 is cut and discharged onto the booklet storage tray T5.

In this manner, the cutting size W can be set on the basis of the difference amount (maximum offset amount $\alpha_{max}$) between the layout position of image data when the layout interval between juxtaposed image data is minimum (i.e., the page interval is minimum) and that when the layout interval is maximum (i.e., the page interval is maximum). The cutting size W can be efficiently set with high user friendliness.

According to the embodiment, the cutting size of a cut printing medium bundle can be set on the basis of the difference amount (maximum offset amount) between the layout position of an image when the layout interval between juxtaposed images is minimum and that when the layout interval is maximum. The cutting size can be efficiently set with high user friendliness.

Also, according to the embodiment, since the longitudinal dimension of a printing medium and the difference amount can be arbitrarily set by the user, the degree of freedom of setting the cutting size can be increased, and the degree of freedom of setting the layout interval of the image can be increased.

Further, according to the embodiment, since the cutting size can be easily calculated, the control load can be reduced.

Furthermore, since the minimum layout interval between juxtaposed images can be arbitrarily set by the user, the degree of freedom of setting the layout interval between images can be increased. Since the layout interval between images for each printing medium can be easily calculated on the basis of the difference amount and the minimum layout interval between images, the control load can be reduced. The present invention is not limited to the contents of the above embodiment, and can be properly modified without departing from the spirit and scope of the invention.

What is claimed is:

1. A booklet making method of making a booklet, comprising:
    a cutting size setting step of setting a cutting size on the basis of a difference amount between a layout position of an image when a layout interval between images printed on a printing medium is minimum and a layout position of an image when the layout interval between images is maximum;
    an image printing step of adjusting the layout interval between the images printed on the printing medium in accordance with a position of the printing medium in said booklet after center-folding, and printing an image on the printing medium;
    a preparing step of preparing a printing medium bundle by binding and folding a plurality of printing media, wherein the plurality of printing media are folded in half; and
    a cutting step of cutting an edge of the printing medium bundle on the basis of the cutting size, wherein the plurality of printing media are cut after being center-bound and center-folded.

2. The method of claim 1, wherein in the image printing step, the layout interval between the images printed on the printing medium is adjusted in accordance with the number of image data.

3. The method of claim 1, wherein the image printing step includes the step of rearranging an image printing order of a plurality of image data, and an image is printed on a printing medium on the basis of the rearranged image data.

4. The method of claim 1, further comprising:
    a dimension setting step of setting a longitudinal dimension of the printing medium; and
    a difference amount setting step of setting the difference amount,
    wherein in the cutting size setting step, the cutting size of the cut printing medium bundle is calculated and set on the basis of the dimension set in the dimension setting step and the difference amount set in the difference amount setting step.

5. The method of claim 4, wherein a cutting size W of the cut printing medium bundle is calculated by $$W=(Y/2)-a$$

Y: longitudinal dimension of the printing medium
a: difference amount.

6. The method of claim 1, further comprising:
    a layout interval inputting step of inputting a minimum layout interval between juxtaposed images; and
    a layout interval calculation step of calculating the layout interval between the juxtaposed images for each printing medium on the basis of the difference amount, and the minimum layout interval between the juxtaposed images that is inputted in the layout interval inputting step.

7. A booklet making system comprising:
    a cutting size setting section which sets a cutting size on the basis of a difference amount between a layout position of an image when a layout interval between images printed on a printing medium is minimum and a layout position of an image when the layout interval between images is maximum;
    an image printing section which adjusts the layout interval between the images printed on the printing medium in accordance with a position of the printing medium in said booklet after center-folding, and prints an image on the printing medium;
    a preparing section which prepares a printing medium bundle by binding and folding a plurality of printing media, wherein the plurality of printing media are folded in half; and
    a cutting section which cuts an edge of the printing medium bundle on the basis of the cutting size, wherein the plurality of printing media are cut after being center-bound and center-folded.

8. The system of claim 7, wherein said image printing section adjusts the layout interval between the images printed on the printing medium in accordance with the number of image data.

9. The system of claim 7, further comprising a device which rearranges an image printing order of a plurality of image data,
    wherein said image printing section forms an image on a printing medium on the basis of the plurality of image data in the rearranged image printing order.

10. The system of claim 7, further comprising:
a dimension setting section which sets a longitudinal dimension of the printing medium; and
a difference amount setting section which sets the difference amount,
wherein said cutting size setting section calculates and sets the cutting size of the cut printing medium bundle on the basis of the dimension set by said dimension setting section and the difference amount set by said difference amount setting section.

11. The system of claim 10, wherein a cutting size W of the cut printing medium bundle is calculated by $$W=(Y/2)-a$$

Y: longitudinal dimension of the printing medium
a: difference amount.

12. The system of claim 7, further comprising:
a layout interval inputting section which inputs a minimum layout interval between juxtaposed images; and
a layout interval calculation section which calculates the layout interval between the juxtaposed images for each printing medium on the basis of the difference amount, and the minimum layout interval between the juxtaposed images that is inputted by said layout interval inputting section.

13. The program which causes a computer for rearranging an image printing order of a plurality of image data, adjusting a layout interval between images printed on a printing medium in accordance with a position of the printing medium in said booklet after center-folding, printing on the printing medium, binding a bundle of printing media bearing images, folding the printing medium in half, cuffing an edge of the printing medium bundle after center-binding and center-folding, and making the printing medium bundle into a saddle-stitched booklet folded in half, to implement
a cuffing size setting function of setting a cutting size of the cut printing medium bundle on the basis of a difference amount between a layout position of an image when the layout interval between juxtaposed image data is minimum and a layout position of an image when the layout interval between juxtaposed image data is maximum.

14. The program according to claim 13, further causing the computer to implement
a dimension setting function of setting a longitudinal dimension of the printing medium, and
a difference amount setting function of setting the difference amount,
wherein the cutting size setting function calculates and sets the cutting size of the cut printing medium bundle on the basis of the dimension set by the dimension setting function and the difference amount set by the difference amount setting function.

15. The program according to claim 14, wherein a cutting size W of the cut printing medium bundle is calculated by $$W=(Y/2)-a$$

Y: longitudinal dimension of the printing medium
a: difference amount.

16. The program according to anyone of claims 13 to 15, further causing the computer to implement:
a layout interval inputting function of inputting a minimum layout interval between the juxtaposed images; and
a layout interval calculation function of calculating the layout interval between the juxtaposed images for each printing medium on the basis of the difference amount, and the minimum layout interval between the juxtaposed images that is inputted by the layout interval inputting function.

* * * * *

UNITED STATES PATENT AND TRADEMARK OFFICE
CERTIFICATE OF CORRECTION

PATENT NO.       : 7,744,325 B2
APPLICATION NO.  : 11/408978
DATED            : June 29, 2010
INVENTOR(S)      : Masaru Ushio et al.

It is certified that error appears in the above-identified patent and that said Letters Patent is hereby corrected as shown below:

In claim 7, column 20, line 39, "cuffing" should read --cutting--.

In claim 13, column 21, line 32, "cuffing" should read --cutting--.

In claim 13, column 22, line 1, "cuffing" should read --cutting--.

In claim 16, column 22, line 24, "anyone" should read --any one--.

Signed and Sealed this
Twenty-second Day of February, 2011

David J. Kappos
*Director of the United States Patent and Trademark Office*